Sept. 29, 1970     I. D. JOHNSON     3,531,633
INTEGRATING APPARATUS USING VOLTAGE TO FREQUENCY CONVERTER
Filed June 29, 1965
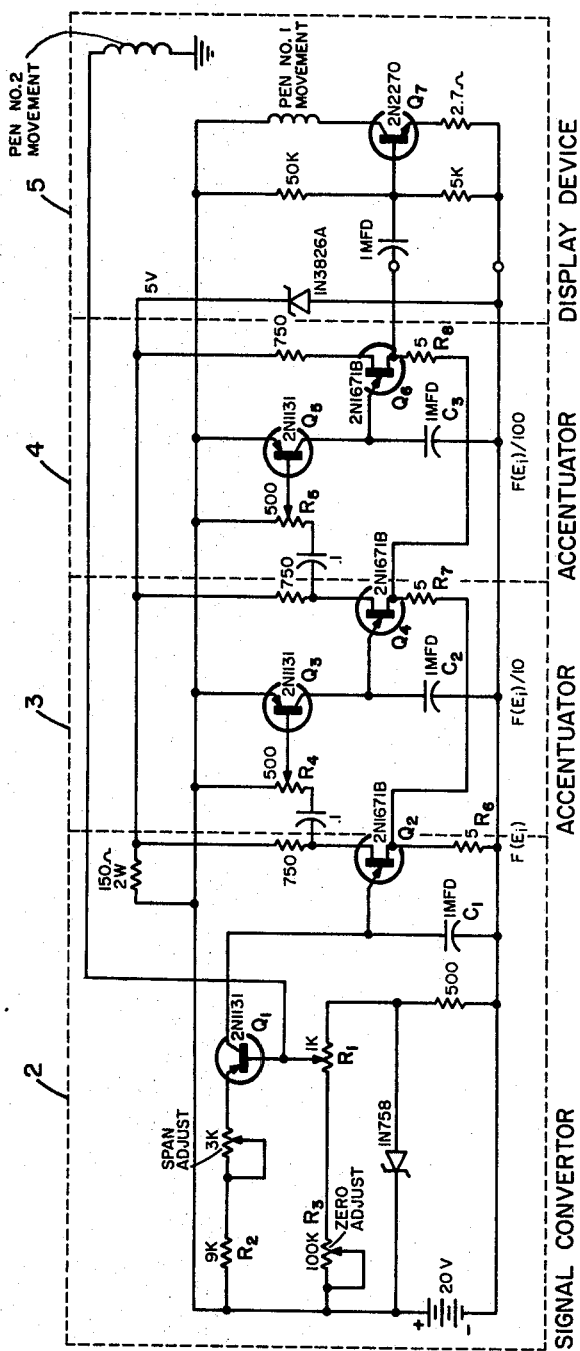
INVENTOR
IRVIN D. JOHNSON
BY
ATTORNEY United States Patent Office 3,531,633
Patented Sept. 29, 1970

3,531,633
INTEGRATING APPARATUS USING VOLTAGE TO FREQUENCY CONVERTER
Irvin D. Johnson, Littleton, Colo., assignor to Marathon Oil Company, Findlay, Ohio, a corporation of Ohio
Filed June 29, 1965, Ser. No. 468,040
Int. Cl. G06g 7/18
U.S. Cl. 235—183               9 Claims

ABSTRACT OF THE DISCLOSURE

The integral of an electrical signal can be displayed by apparatus comprising a signal converter means for converting the signal into a series of pulses each of which have equal amplitude, with a number of such pulses occurring within a given time being proportional to the integral of the electrical signal during the same period of time, together with display means for displaying the pulses arranged with respect to time.

---

The present invention relates to new devices for the processing of electrical signals and in particular relates to new methods and devices for integrating such signals.

In the measurement of a wide variety of variables, including for example, process conditions such as temperature and pressure which are commonly measured by pressure transducers and thermistors, respectively, sensing devices send out a signal which varies in either voltage or amperage in proportion to the value of the function which they are sensing. In many cases, the value of the function itself and also of the integral of the function, that is, the area under the function curve, are of interest. One especially important example of the need for integrating the area under curves is the vapor phase chromatograph which has become a widely used analytic instrument over the past decade.

A variety of automatic integrating devices are available including ball and disc integrators, watt-hour meters, and numerous other devices. Most of the devices proposed or now in use have been either bulky, as in the case of the watt-hour meters, or expensive, or both. The present invention is a light, compact unit which can be readily fitted into the interior of many conventional strip-chart recorders and which can be produced at relatively low cost.

In addition, the present invention in its preferred embodiments permits the determination of the integral of a function between any two points in time. These points need not be selected prior to the recording of the variable as is necessary with most counter-type integrators. This feature is especially important with chromatographs where the precise interval over which the integral is to be determined is best selected by reviewing the finished chart of the primary function.

The present invention preferably accomplishes this point-to-point integration by marking small "pips" along one edge of a strip-chart recorder, or oscilloscope screen or other display device. In most cases, the primary function will be conventionally recorded on a strip chart and the integral will be indicated by a second pen making a series of pips running along the left-hand edge. The number of such pips occurring between any two points on the curve of the primary function indicates the integral under the curve. In the most preferred embodiments of the present invention, every fifth or tenth or hundredth pip is made higher by an accentuating circuit, described hereinafter.

The figure is a circuit diagram of a preferred embodiment of the present invention in which the circuitry takes its electrical signal from the retransmitting slide-wire of a conventional strip-chart recorder such as the Leeds and Northrop Model W equipped with the conventional retransmitting slide-wire option manufactured by Leeds and Northrop.

In the figure the retransmitting slide-wire $R_1$ varies in proportion to the signal being sent to the recorder by any conventional sensing element such as a thermistor, pressure transducer, vapor phase chromatograph, photoelectric cell, etc.

The electrical signal (varying voltage) from $R_1$ is applied to the base of transistor $Q_1$. This signal is proportional to the height of the curve to be integrated. The output current on the collector of transistor $Q_1$ is proportional to the voltage on the base and that output current is applied to charge capacitor $C_1$. Charge capacitor $C_1$ retains its charge until the voltage across it is sufficient to fire the unijunction transistor $Q_2$ which, in firing, allows capacitor $C_1$ to discharge. Pulse frequency output from the unijunction transistor is proportional to the voltage input at the base of $Q_1$. The system described in this paragraph is termed for the purposes of this application, the signal converter.

The output from the signal converter can be fed directly to a display device such as a digital frequency counter of ether the electro-mechanical or the electronic type, or preferably, to a conventional two-pen strip-chart recorder. On the preferred strip-chart recorder, the output from the signal converter will appear as a series of "pips" which are preferably located along one edge of a linear strip chart. The integral between any two points on the curve plotted by the recorder on the strip chart is determined by simply counting the number of pips occurring between these two points on the strip chart.

Because of the necessity for counting a large number of pips in order to determine the integral in many operations, and also because of limitations in the resolution which may be obtained by strip-chart recorders where pips occur close together, it is preferred to further process the signal from the signal converter prior to feeding it to the recorder.

This processing of the signal from the signal converter is preferably accomplished by circuitry which accentuates every $n$th pulse emitted by the signal converter. Preferred circuitry is shown in the figure as the accentuator 3.

In the figure the signal converter emits a more positive signal consisting of a series of pulses of equal amplitude with a frequency which is proportional to the voltage input to the base of PNP-type transistor $Q_1$; and also a less positive signal consisting of a series of pulses having the same frequency as the more positive signal.

The less positive signal from the signal converter is applied to the base of PNP-type transistor $Q_3$ in the accentuator 3. The more positive output from the signal converter is applied across the 5-ohm resistor $R_6$ to the display device 5. Transistor $Q_3$ acts as an amplifier for the output from the signal converter and the amplified pulses are applied to a divider which comprises capacitor $C_2$ and unijunction transistor $Q_4$. The voltage at the emitter of $Q_4$ builds up as each pulse is received until the voltage reaches the breakdown point of transistor $Q_4$. $C_2$ then discharges through two 5-ohm resistors, $R_6$ and $R_7$. Since $C_1$ and $C_2$ discharge simultaneously when the voltage of emitter $Q_4$ has reached the breakdown point, the pulse transmitted to the display device 5 at this instant is larger than the pulses transmitted when only $C_1$ discharges.

By adjusting resistor $R_4$ to vary the amplitude of the less positive pulses being fed by the signal converter to the accentuator 3 so that $n$ pulses are required to reach the breakdown voltage of transistor $Q_4$, every $n$th pulse transmitted to the display device 5 will be accentuated.

In most cases, $n$ will preferably be 5 or 10 for ease of counting.

In the figure an additional accentuator 4, which adds further accentuating to every $m$th pulse transmitted to the display device 5, is utilized. The circuitry of accentuator 4 is identical with that of accentuator 3. Resistor $R_5$, transistor $Q_5$, transistor $Q_6$, and capacitor $C_3$ each function identically with resistor $R_4$, transistor $Q_3$, transistor $Q_4$ and capacitor $C_2$, respectively, of accentuator 3.

Outputs from the signal converter, accentuator 3 and accentuator 4, are combined across resistors $R_6$, $R_7$, and $R_8$. Thus the display device receives an accentuated $n$th pulse and a more greatly accentuated $m$th pulse together with the normal pulses from the signal converter.

In preferred embodiments of the present invention, the accentuated pulses will be shown as pips of greater height along the edge of the strip-chart recorder. Because only the pips of greater height, e.g., every 10th or 100th pip, need be counted in order to determine the integral of the variable being plotted by the strip-chart recorder, blurring of the individual pips due to the relatively low resolution of this type of recorder does not prevent reading of the integral of the function, and counting is rapid.

Where display devices other than strip-chart recorders are utilized, e.g., where electro-mechanical counters are employed, a threshold value may be established so that the display device is actuated only by the accentuated $n$th or $m$th pulses. This reduces wear on the counter or other display device and permits the use of less expensive slower response display devices.

Another variation of the present invention is to display on an oscilloscope screen by conventional circuitry, the individual pulses with the accentuated pulses, and with or without the direct function, the integral of which is being taken.

It should be understood that although the above described preferred embodiment illustrates the invention as practiced when the signal is supplied by the retransmitting slide-wire of a conventional strip-chart recorder, any other source of electrical signal having varying unidirectionally voltage or varying unidirectionally amperage may be employed with the invention. For example, a thermistor or other sensing device connected through a suitable conventional amplifier may be employed as the source of the electrical signal.

Also, while the term unijunction transistor has been used throughout the discussion of the present invention, it should be understood that any breakdown device such as a tunnel diode, point contact transistor, silicon controlled switch, silicon controlled rectifier, neon lamp or other conventional breakdown device may be employed.

Other variations and modifications within the spirit of the invention will be apparent to those skilled in the art.

What is claimed is:

1. Apparatus for displaying indicia for deriving the integral of an electric signal comprising in combination signal converter means for converting said signal into a series of pulses, the number of said pulses occurring within a given period of time being proportional to the integral of said electrical signal during the same period of time and display means driven by said series of pulses for displaying a plurality of said pulses as visible markings spaced over a time interval, wherein the signal converter means comprises in combination a voltage controlled current source, a capacitor, and unijunction transistor; said voltage controlled current source charging said capacitor until the voltage on said capacitor reaches the firing point of said unijunction transistor whereby the capacitor is discharged and a pulse generated, wherein said display means is a chart recorder having a chart, a first marking means tracing a plot of the amplitude of said electrical signal versus time on said chart and a second marking means recording on said chart said visible markings indicative of said pulses, said markings indicative of said pulses being so positioned that the number of pulse markings appearing on an interval of said chart is indicative of the integral of said plot traced on the same interval of said chart, whereby the interval over which the integral is to be determined can be selected in view of the completed plot.

2. The apparatus of claim 1 wherein the electrical signal is a varying voltage signal.

3. The apparatus of claim 1 wherein the electrical signal is a varying amperage signal.

4. The apparatus of claim 1 wherein said pulses drive an accentuator means which automatically increases the amplitude of every $n$th pulse emitted by said signal converter means, and pulses from said accentuator means drive said display device.

5. The apparatus of claim 4 wherein a plurality of said accentuator means are operably connected so as to accentuate every $n$th more positive pulse and to further accentuate every $m$th more positive pulse transmitted to said display device, and wherein $m$ is an integer greater than $n$.

6. Apparatus for displaying indicia for deriving the integral of an electric signal comprising in combination signal converter means for converting said signal into a series of pulses, the number of said pulses occurring within a given period of time being proportional to the integral of said electrical signal during the same period of time and display means driven by said series of pulses for displaying a plurality of said pulses as visible markings spaced over a time interval, wherein the signal converter means comprises in combination a voltage controlled current source, a capacitor, and unijunction transistor; said voltage controlled current source charging said capacitor until the voltage on said capacitor reaches the firing point of said unijunction transistor whereby the capacitor is discharged and a pulse generated, wherein said pulses drive an accentuator means which automatically increases the amplitude of every $n$th pulse emitted by said signal converter means, and pulses from said accentuator means drive said display means, and wherein the accentuating means comprises in combination an amplifier which receives a less positive signal consisting of pulses from the base of the unijunction transistor of said signal conversion means, said amplifier being connected to a divider which divider is connected to a line transmitting a more positive signal consisting of pulses from the second base of said unijunction transistor in said signal conversion means to said display device, hereby said divider upon receiving $n$ less positive pulses automatically transmits a pulse to said more positive pulse line, thereby accenting every $n$th more positive pulse transmitted to said display means, wherein said display means is a chart recorder having a chart, a first marking means tracing a plot of the amplitude of said electrical signal versus time on said chart and a second marking means recording on said chart said visible markings indicative of said pulses, said markings indicative of said pulses being so positioned that the number of pulse markings appearing on an interval of said chart is indicative of the integral of said plot traced on the same interval of said chart, whereby the interval over which the integral is to be determined can be selected in view of the completed plot.

7. The apparatus of claim 6 wherein the electrical signal is a varying voltage signal.

8. The apparatus of claim 6 wherein the electrical signal is a varying amperage signal.

9. The apparatus of claim 6 wherein a plurality of said accentuator means are operably connected so as to accentuate every $n$th more positive pulse and to further accentuate every $m$th more positive pulse transmitted to said display device, and wherein $m$ is an integer greater than $n$.

(References on following page)

References Cited

UNITED STATES PATENTS

| | | | |
|---|---|---|---|
| 1,106,710 | 8/1914 | Ingalls | 324—113 X |
| 3,060,388 | 10/1962 | Ball et al. | 332—9 |
| 3,230,358 | 1/1966 | Davis et al. | 235—183 |
| 3,287,640 | 11/1966 | Rehage | 307—261 |
| 3,337,722 | 8/1967 | Siess et al. | 235—92 |
| 3,361,979 | 1/1968 | Luttik et al. | 328—114 |

MALCOLM A. MORRISON, Primary Examiner

F. D. GRUBER, Assistant Examiner

U.S. Cl. X.R.

235—92; 307—261, 268, 271; 324—113; 328—114; 346—50, 78